(12) United States Patent
Kim et al.

(10) Patent No.: US 9,635,692 B2
(45) Date of Patent: Apr. 25, 2017

(54) METHODS OF ENSURING NETWORK CONTINUITY PERFORMED AT LOCAL GATEWAY, FIXED GATEWAY, AND NETWORK DEVICE

(71) Applicant: ELECTRONICS & TELECOMMUNICATIONS RESEARCH INSTITUTE, Daejeon (KR)

(72) Inventors: Sun Cheul Kim, Daejeon (KR); Seung Woo Hong, Daejeon (KR); Young Soo Shin, Daejeon (KR); Ho Yong Ryu, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 14/594,578

(22) Filed: Jan. 12, 2015

(65) Prior Publication Data
US 2015/0201442 A1    Jul. 16, 2015

(30) Foreign Application Priority Data
Jan. 13, 2014 (KR) .......................... 10-2014-0003916

(51) Int. Cl.
H04W 4/00         (2009.01)
H04W 76/02        (2009.01)
(Continued)

(52) U.S. Cl.
CPC ......... *H04W 76/022* (2013.01); *H04L 61/256* (2013.01); *H04L 61/2592* (2013.01);
(Continued)

(58) Field of Classification Search
CPC . H04W 76/022; H04W 36/12; H04W 76/021; H04L 61/256; H04L 61/2592
(Continued)

(56) References Cited

U.S. PATENT DOCUMENTS

2004/0218611 A1\* 11/2004 Kim .................... H04L 12/4633
370/401
2007/0081530 A1\* 4/2007 Nomura ................ H04L 12/185
370/389
(Continued)

FOREIGN PATENT DOCUMENTS

KR     20070024388 A     3/2007
KR     20080050973 A     6/2008
(Continued)

*Primary Examiner* — Mang Yeung
(74) *Attorney, Agent, or Firm* — Ladas & Parry LLP

(57) ABSTRACT

Provided are methods of ensuring network continuity performed at a local gateway, a fixed gateway, and a network device. The method of ensuring network continuity performed at a local gateway includes establishing a tunnel with a fixed gateway serving as a relay between an Internet service server and the local gateway, and performing communication with the fixed gateway through the tunnel. Therefore, even when the type of an uplink signal received by a local gateway changes or the local gateway is in an uplink signal shadow area, a terminal connected to the local gateway can be provided with a seamless Internet service.

9 Claims, 8 Drawing Sheets

(51) Int. Cl.
  *H04W 36/12*   (2009.01)
  *H04L 29/12*   (2006.01)
  *H04W 36/00*   (2009.01)

(52) U.S. Cl.
  CPC ........ *H04W 36/0011* (2013.01); *H04W 36/12* (2013.01); *H04W 76/021* (2013.01)

(58) Field of Classification Search
  USPC ........................................................ 370/329
  See application file for complete search history.

(56) References Cited

U.S. PATENT DOCUMENTS

| | | |
|---|---|---|
| 2009/0279515 A1 | 11/2009 | Cheon et al. |
| 2010/0008260 A1 | 1/2010 | Kim et al. |
| 2010/0046558 A1* | 2/2010 | Velev .................... H04W 28/06 370/477 |
| 2010/0265916 A1 | 10/2010 | Cheon et al. |
| 2011/0082941 A1 | 4/2011 | Kim et al. |
| 2013/0133057 A1* | 5/2013 | Yoon ........................ G06F 21/00 726/12 |
| 2013/0191906 A1 | 7/2013 | Park et al. |

FOREIGN PATENT DOCUMENTS

| | | |
|---|---|---|
| KR | 20090065247 A | 6/2009 |
| KR | 20110037833 A | 4/2011 |
| KR | 20110045885 A | 5/2011 |
| KR | 20130085854 A | 7/2013 |

\* cited by examiner

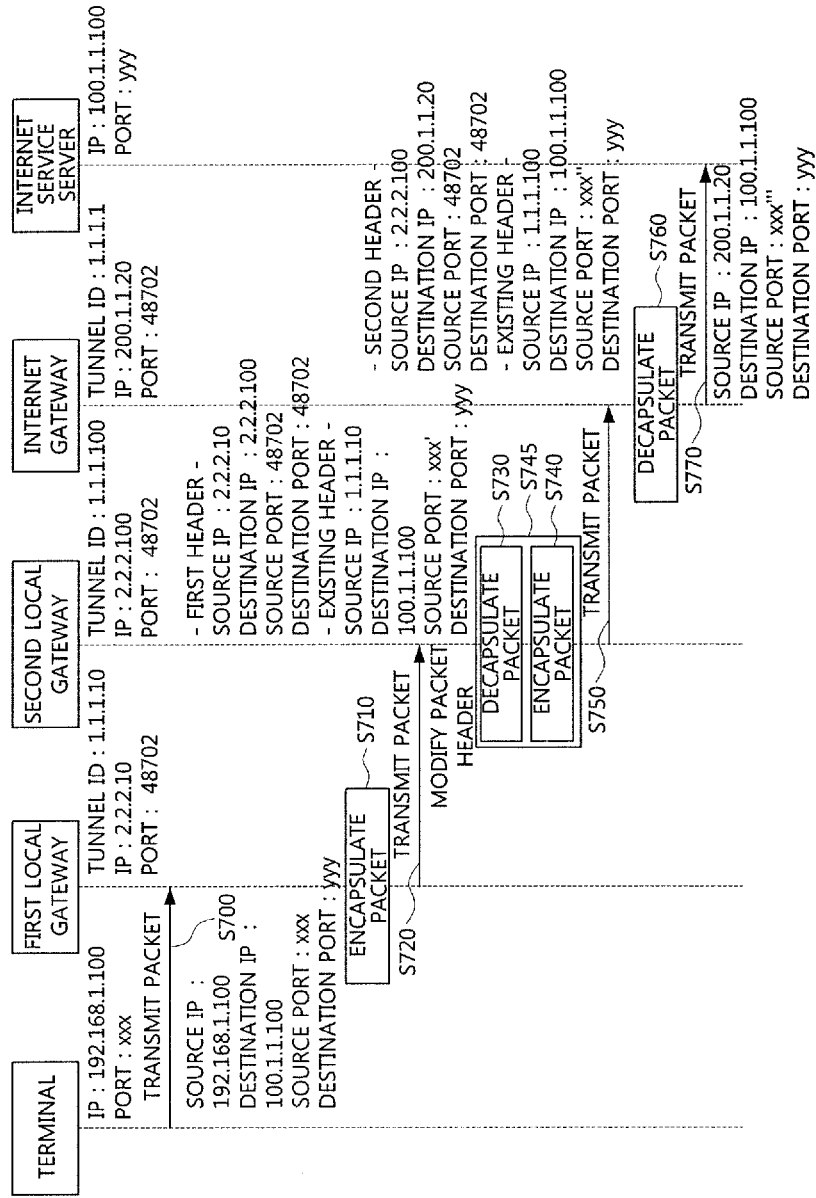

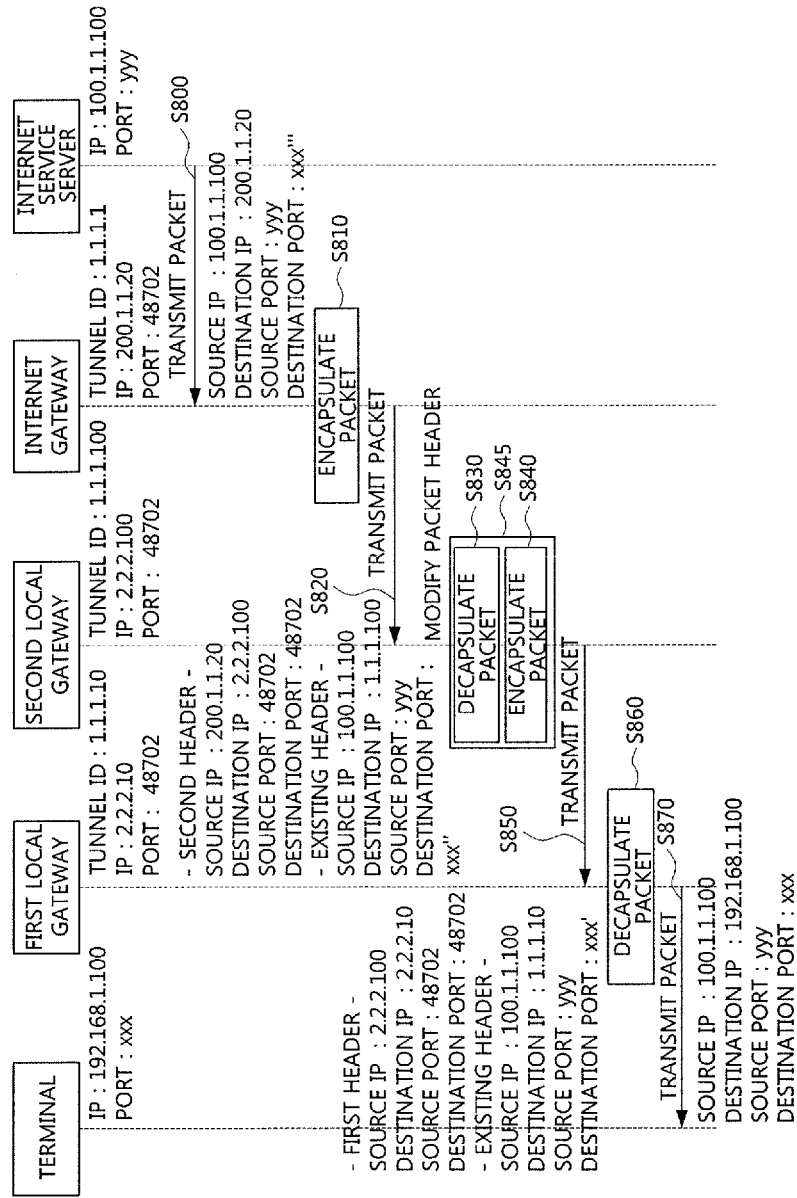

METHODS OF ENSURING NETWORK CONTINUITY PERFORMED AT LOCAL GATEWAY, FIXED GATEWAY, AND NETWORK DEVICE

CLAIM FOR PRIORITY

This application claims priority to Korean Patent Application No. 2014-0003916 filed on Jan. 13, 2014 in the Korean Intellectual Property Office (KIPO), the entire contents of which are hereby incorporated by reference.

BACKGROUND

1. Technical Field

Example embodiments of the present invention relate in general to technology for ensuring network continuity, and more particularly, to an apparatus and method for providing a seamless Internet service to a terminal while supporting several types of uplink mobile communication signals, such as a third generation (3G) signal, a 4G signal, and a satellite signal.

2. Related Art

Along with the development of information and communications technology, demands for accessing the Internet regardless of a location have risen. In particular, due to a recent increase in the use of smart phones and tablet personal computers (PCs), such demands are further increasing. As technology related to the demands, mobile Internet protocol (IP) technology is intended to support mobility of a terminal connected to the Internet. In order for a terminal to be connected with the Internet at all times while moving, it is necessary to solve many problems. Fundamentally, the Internet is configured in the form of several subnets connected through routers, and the routers transmit packets based on network prefixes. Therefore, it is difficult for a mobile node (MN) moving from one subnet to another subnet to maintain its Internet connection. In other words, in order for the MN to perform communication in the other subnet, the MN is required to be assigned a new IP address in the other subnet, but the change of the IP address denotes disconnection in the transport layer that is an upper layer in terms of an IP. In existing Internet technology, an IP address is information that distinguishes a terminal from others and also denotes the location of the terminal fundamentally, and thus it is not possible to forward a packet to the variable location of a moving terminal.

As a mobile IP for forwarding packets sent to an existing IP address to a current location of the terminal in this environment, there are mobile Internet protocol version 4 (MIPv4), mobile Internet protocol version 6 (MIPv6), and so on. According to these existing methods, a tunnel is created from an original location (home address) denoted by an IP address to a current location (temporary address), and packets are forwarded to the moving terminal. In other words, all packets to be forwarded to the mobile terminal are first sent to a home agent (HA) in which the mobile terminal has been registered, and the HA forwards the packets to the mobile terminal through the tunnel. Here, the tunnel is established between the HA and the mobile terminal. Also, every time the mobile terminal moves, an existing location of the tunnel is updated with a current location. In this case, all terminals are only required to generate packets with transmission and reception IP addresses using the existing IP as is and transfer the packets to routers.

However, every time the location of a mobile terminal changes, the mobile terminal is required to control location registration and tunnel creation for forwarding a packet from a fixed IP location to the mobile terminal at a current location. Since the load of maintaining a home address and tunnel creation is too much for the mobile terminal, a proxy mobile Internet protocol (PMIP) technology in which a network instead of a terminal serves a protocol for supporting mobility has been recently devised. The PMIP is a mobility management protocol in which a network component, instead of a terminal, present in a network and referred to as a proxy, processes tasks to be processed at a receiving end, such as registration of a current location and establishment of a tunnel from a fixed IP location to a current location. It is unnecessary for a terminal to update its location or establish a tunnel with a home address so as to forward a packet, and a proxy component present in a network processes these tasks.

However, it is not possible to use the above-described methods when the type of an uplink signal receivable at one location changes or it is not possible to receive any uplink signal because a network device for receiving a mobile communication signal and providing a wireless Internet signal to a terminal moves.

SUMMARY

Accordingly, example embodiments of the present invention are proposed to substantially obviate one or more problems of the related art as described above, and provide a network continuity ensuring method for providing a stable wireless Internet signal to a terminal in an environment in which uplink signals are limited.

Example embodiments of the present invention also provide a network continuity ensuring apparatus for performing the above method.

Other purposes and advantages of the present invention can be understood through the following description, and will become more apparent by example embodiments of the present invention. Also, it is to be understood that purposes and advantages of the present invention can be easily achieved by means disclosed in claims and a combination of them.

In some example embodiments, a method of ensuring network continuity performed at a local gateway includes: establishing a tunnel with a fixed gateway serving as a relay between an Internet service server and the local gateway; and performing communication with the fixed gateway through the tunnel.

Here, the local gateway may communicate with the fixed gateway based on a plurality of communication schemes.

Here, the local gateway may communicate with a terminal served by the local gateway based on a wireless local area network (WLAN) scheme.

Here, the establishing of the tunnel may include: transmitting a message for requesting tunnel establishment to the fixed gateway; and receiving a tunnel identifier (ID) of the local gateway and a tunnel ID of the fixed gateway in response to the transmission.

Here, the performing of the communication may include, when a packet is received from a terminal: modifying a source Internet protocol (IP) address in a header of the received packet into the tunnel ID of the local gateway; adding a tunnel header to the modified packet; setting an IP address of the local gateway as a source IP address in the tunnel header; and setting an IP address of the fixed gateway as a destination IP address in the tunnel header.

Here, the performing of the communication may include, when a packet is received from the fixed gateway: removing a tunnel header added by the fixed gateway; and setting a destination IP address of a remaining header as an IP address of a terminal which will receive the packet.

In other example embodiments, a method of ensuring network continuity performed at a fixed gateway serving as a relay between an Internet service server and a local gateway includes: establishing a tunnel with the local gateway; and performing communication with the local gateway through the established tunnel.

Here, the fixed gateway may communicate with the local gateway based on a plurality of communication schemes.

Here, the establishing of the tunnel may include: receiving a tunnel establishment request message from the local gateway; and transmitting a tunnel ID of the fixed gateway and a tunnel ID of the local gateway in response to the reception.

Here, the performing of the communication may include, when a packet is received from the local gateway: removing a tunnel header added by the local gateway; and setting a source IP address of a remaining header as an IP address of the fixed gateway.

Here, the performing of the communication may include, when a packet is received from an Internet service server providing an Internet service: modifying a destination IP address in a header of the received packet with the tunnel ID of the local gateway; adding a tunnel header to the modified packet; setting an IP address of the fixed gateway as a source IP address in the tunnel header; and setting an IP address of the local gateway as a destination IP address in the tunnel header.

In other example embodiments, a method of ensuring network continuity performed at a network device includes: receiving reception state information from a plurality of local gateways; determining a second local gateway having a reception state better than a previously set reference and capable of communicating with a first local gateway whose reception state is equal to or worse than the previously set reference; and providing information on the second local gateway to the first local gateway.

Here, the determining of the second local gateway may include: receiving a connection to another-local-gateway request message from the first local gateway; and determining the second local gateway in response to the received request message.

Here, the determining of the second local gateway may include determining the second local gateway based on at least one of uplink signal reception rates and bandwidth-relative traffic capacities of the plurality of local gateways included in the received reception state information.

BRIEF DESCRIPTION OF DRAWINGS

Example embodiments of the present invention will become more apparent by describing in detail example embodiments of the present invention with reference to the accompanying drawings, in which:

FIG. 7 illustrates a process in which a local gateway transmits a packet via another gateway according to an example embodiment of the present invention; and FIG. 8 illustrates a process in which a local gateway receives a packet via another local gateway according to an example embodiment of the present invention.

DESCRIPTION OF EXAMPLE EMBODIMENTS OF THE PRESENT INVENTION

Figure 1:
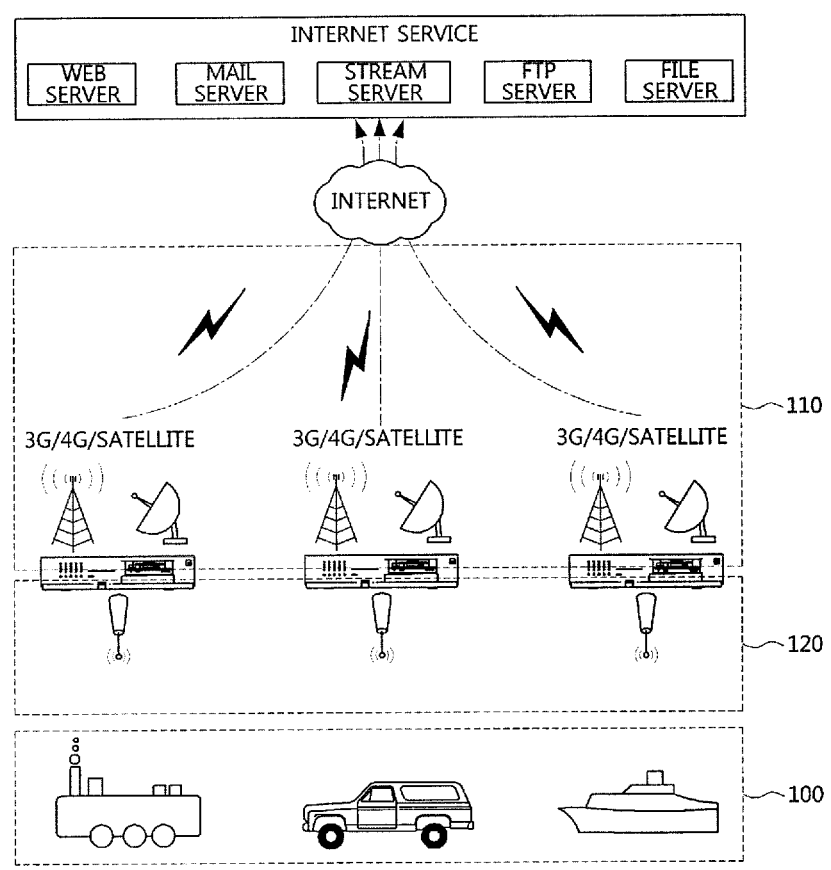
FIG. 1 shows a limited network environment.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

It will be understood that, although the terms "first," "second," "A," "B," etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.). It will be understood that the term "connect" does not only denote a physical connection of an element stated herein but also denotes an electrical connection, a network connection, and so on.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes." and/or "including," when used herein, specify the presence of stated features, numbers, steps, operations, elements, parts and/or combinations thereof, but do not preclude the presence or addition of one or more other features, numbers, steps, operations, elements, parts, and/or combinations thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used herein may be referred to as a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or so on. Various examples of a terminal may include a cellular phone, a smart phone having a wireless communication function, a personal digital assistant (PDA) having a wireless communication function, a wireless model, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but are not limited to these.

Hereinafter, example embodiments of the present invention will be described in detail with reference to the accompanying drawings. To facilitate general understanding of the present invention, like numbers refer to like elements throughout the description of the figures, and the description of the same component will not be reiterated.

FIG. 1 shows a limited network environment.

Referring to FIG. 1, in a specific space 100 such as a vehicle, a train, and a ship in which it is difficult to provide an Internet service by wire, a network device for providing the Internet service receives mobile communication signals 110, such as a third generation (3G) signal, a 4G signal, and a satellite signal, as uplink signals, and converts the uplink signals into wireless Internet signals 120, such as wireless local area network (WLAN) signals, thereby providing the Internet service to terminals.

In this method, the network device may be implemented by uplinking 3G, 4G, and satellite signal processing modules to an existing gateway and downlinking the existing gateway to access points (APs). According to characteristics of each mobile communication signal or the location of a signal provider (base station, satellite, etc.), a location at which it is possible to receive the signal may vary. For example, while it is possible to receive 3G, 4G, and satellite signals at a point A, it may be possible to receive only 3G and satellite signals at a point B that is 1 km apart from the point A. Therefore, the types of mobile communication signals receivable by a gateway installed in a mobile environment, such as a vehicle, a train, or a ship, may vary according to the location of the gateway.

When movement of the gateway results in a reduction in the reception rate of a mobile communication signal that has been received by the gateway or makes it impossible to receive the mobile communication signal, the gateway may continue communication by selecting another mobile communication signal. When the type of a mobile communication signal used for communication by the gateway changes, the gateway is connected to a new network and thus is assigned a new IP address. In this case, since a server for providing an Internet service (hereinafter, referred to as an "Internet service server") provides the Internet service through the IP address of the gateway, the Internet service provided to a terminal connected to the gateway is terminated. In the case of a web service, the terminal may perform reconnection, whereas in the case of a real-time service such as a streaming service, there may be considerable inconvenience in the use of the service.

A method of ensuring network continuity described below may be performed at a gateway including a computing device such as a central processing unit (CPU), an application processor, and a microprocessor, a storage device such as a random access memory (RAM), a read-only memory (ROM), a hard disk drive (HDD), a solid-state drive (SSD), or a flash memory, a communication device such as a LAN card, an Ethernet card, or a network adaptor.

Figure 2:
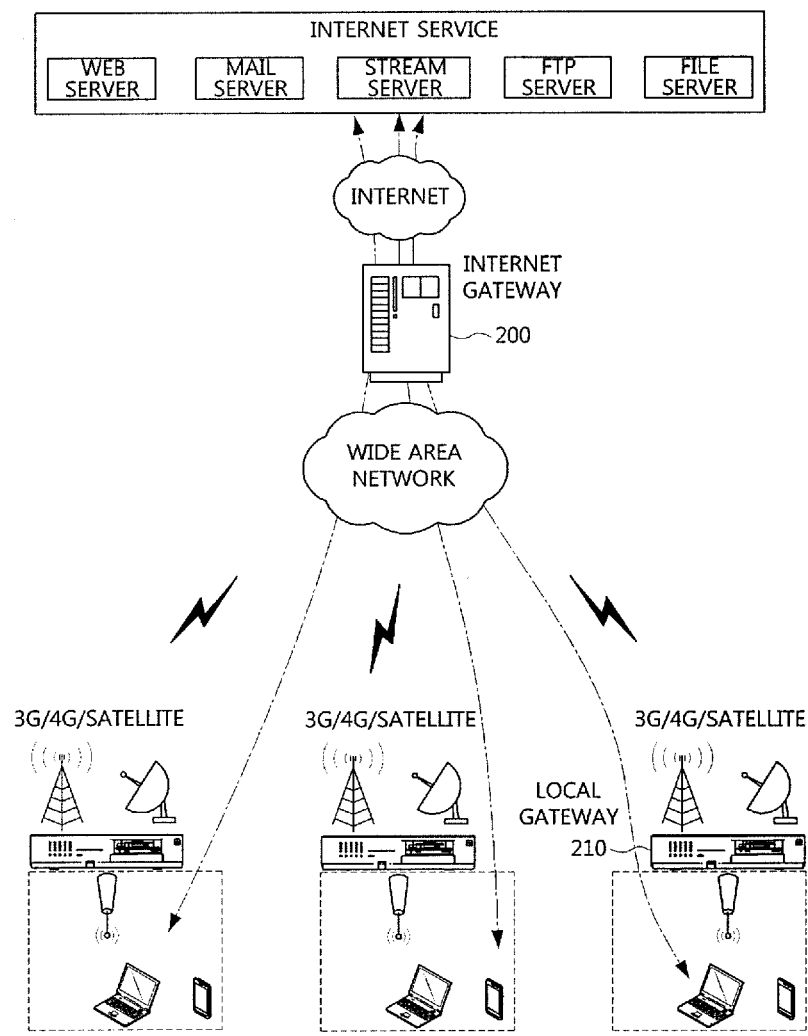
FIG. 2 shows the concept of ensuring network continuity according to an example embodiment of the present invention.

FIG. 2 shows the concept of ensuring network continuity according to an example embodiment of the present invention.

Referring to FIG. 2, an overall network may include an Internet gateway 200 and a local gateway 210 in a path for transferring a packet between an Internet service server and a terminal. The Internet gateway 200 may be connected to the Internet at a fixed location, and the local gateway 210 may be connected to the Internet gateway 200 through an uplink mobile communication signal in a mobile environment such as a vehicle, a train, or a ship.

The Internet gateway 200 may be interposed between the local gateway 210 and the Internet service server in a network structure. The Internet service server may provide various Internet services using a web site, e-mail, a stream, a file transfer protocol (FTP), a file server, and so on.

The local gateway 210 may support various upstream mobile communication signals, such as a 3G signal, a 4G signal, and a satellite signal, and may support a downstream Internet signal wirelessly or by wire. The local gateway 210 may support uplink signals by connecting modules supporting the respective mobile communication signals to the inside or the outside of the local gateway 210. The local gateway 210 may support downlink signals by connecting an AP to the inside or the outside of the local gateway 210.

A tunnel may be created between the local gateway 210 and the Internet gateway 200 by tunneling. Therefore, although the Internet gateway 200 and the local gateway 210 are between the Internet service server and the terminal, it is possible for the Internet service server and the terminal to exchange packets as if they were directly connected. Therefore, even when an uplink communication scheme changes due to a change of the location of the local gateway 210, the terminal may be provided with the stable Internet service.

Here, the local gateway 210 transmits a message for requesting tunnel establishment to the Internet gateway 200, and the Internet gateway 200 responds to the request, so that the tunneling may be performed. The Internet gateway 200 receiving the message may create a tunnel reflecting network address translation (NAT) traversal information, and assign a private IP address to the local gateway 210. At this time, the Internet gateway 200 may create an IP-user datagram protocol (UDP)-IP tunnel with the local gateway 210 in consideration that the local gateway 210 uses the private IP address.

Encapsulation may be performed by adding a new header to the header of a packet at an entrance of the tunnel, and decapsulation may be performed by removing the new header at an exit of the tunnel. For example, when the terminal receives a packet, the packet may be encapsulated at the Internet gateway 200 and decapsulated at the local gateway 210. In another example, when the terminal transmits a packet, the packet may be encapsulated at the local gateway 210 and decapsulated at the Internet gateway 200.

The header of a packet may include various information, such as the source address and the destination address of the packet, a packet type, a packet length, data, and error information of the packet. The new header added to the packet may also include various information as mentioned above. The source and the destination of the new header may be the tunnel entrance and the tunnel exit, respectively. Therefore, the packet may be routed from the tunnel entrance to the tunnel exit based on the information of the new header. The packet is decapsulated at the end point of the tunnel, and then may be routed to the destination included in the original header of the packet.

The local gateway 210 may move, and thus the scheme of a communication signal received by the local gateway 210 may change. Due to the change of the received signal, the local gateway 210 is assigned a new IP address, and thus is required to create a new tunnel with the Internet gateway 200. Here, the creation of a new tunnel means that the terminal using the new tunnel exchanges packets with the Internet service server through a new connection instead of an existing connection. In this case, the Internet service server recognizes the terminal having established the new connection as another terminal that is not the existing terminal and provides a service, and the terminal cannot be continuously provided with the Internet service. Therefore, in order to ensure the continuity of the Internet service for the terminal, it is required to maintain the uniformity of packets having passed through the existing tunnel and the newly created tunnel.

Specifically, information of the header of a packet having passed through the tunnel is required to be uniformly maintained. The Internet gateway 200 and the local gateway 210 transmit and receive a packet using a tunnel ID that provides discrimination, thereby maintaining the uniformity of a packet header having passed through the tunnel. The tunnel ID is used only between the local gateway 210 and the Internet gateway 200. The tunnel ID may be generated in a tunnel creation process of the local gateway 210 and the Internet gateway 200, and has the form of an IP address. Therefore, the tunnel ID may be used instead of an IP address in the tunnel. The IP address of the local gateway 210 is an ID used in the Internet, and thus may change due to movement of the local gateway 210. On the other hand, the tunnel ID of the local gateway 210 is a fixed ID used only between the local gateway 210 and the Internet gateway 200 in the tunnel, and thus does not change due to movement of the local gateway 210. When the packet enters the tunnel, the source or destination IP address of the existing header may be set as the tunnel ID. For example, in a process in which the terminal receives a packet, the destination IP address of an existing header may be set as the tunnel ID by the Internet gateway 200. In another example, in a process in which the terminal transmits a packet, the source IP address of an existing header may be set as the tunnel ID by the local gateway 210.

When a packet is transmitted and received using a tunnel ID, the source of the packet is fixed to be the tunnel ID at the exit of a tunnel. Therefore, even when the local gateway 210 moves or the IP address thereof changes, the local gateway 210 may ensure the continuity of an Internet service for a mobile terminal.

Figure 3:
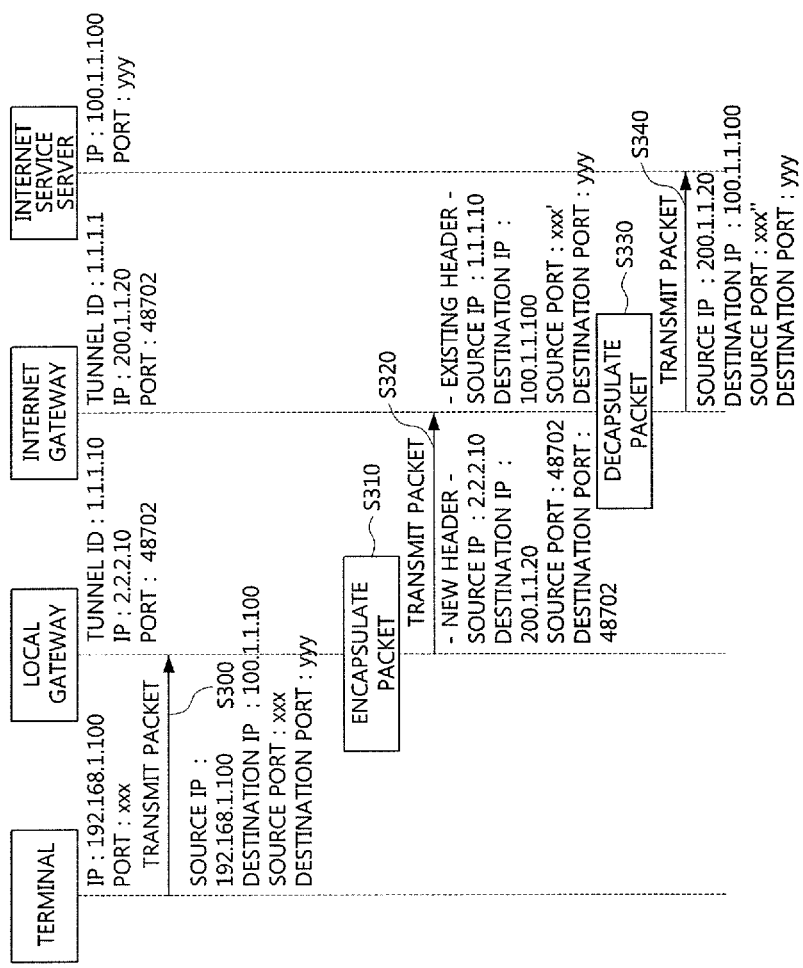
FIG. 3 illustrates a process in which a terminal transmits a packet according to an example embodiment of the present invention.

FIG. 3 illustrates a process in which a terminal transmits a packet according to an example embodiment of the present invention.

FIG. 3 assumes the same environment as FIG. 2, and a mobile terminal, a local gateway, an Internet gateway, and an Internet service server shown in FIG. 3 are assumed for convenience as follows.

—Mobile Terminal—
IP address: 192.168.1.100
Port: xxx
—Local Gateway—
Tunnel ID: 1.1.1.10
IP address: 2.2.2.10
Port: 48702
—Internet Gateway—
Tunnel ID: 1.1.1.1
IP address: 20.1.1.20
Port: 48702
—Internet Service Server—
IP address: 100.1.1.100
Port: yyy Referring to FIG. 3, when the mobile terminal has a packet to transmit to the Internet service server, the mobile terminal may transmit the packet to the local gateway first (S300). The following information may be included in the header of the transmitted packet.

Source ID address: 192.168.1.100
Destination ID address: 100.1.1.100
Source port: xxx
Destination port: yyy Next, the local gateway receiving the packet from the mobile terminal may encapsulate the received packet (S310). Encapsulation denotes that the local gateway adds a new header to the header of the packet and modifies information included in the existing header.

In the new header, the following information having the local gateway as a source and the Internet gateway as a destination may be included.

Source ID address: 2.2.2.10
Destination ID address: 200.1.1.20
Source port: 48702
Destination port: 48702

The source IP address of the existing header may be modified into the tunnel ID of the local gateway, and the source port may be modified into an arbitrary port. The destination IP address and the destination port of the existing header may not change. The information modified in the existing header is shown in detail in Table 1 below.

TABLE 1

| Before modification | | | | After modification | | | |
|---|---|---|---|---|---|---|---|
| Source IP address | Source port | Destination IP address | Destination port | Source IP address | Source port | Destination IP address | Destination port |
| 192.168.1.100 | xxx | 100.1.1.100 | yyy | 1.1.1.10 | xxx' | 100.1.1.100 | yyy |

Here, the new header includes the IP address of the local gateway, but the existing header does not include the IP address of the local gateway. Therefore, even when the IP address of the local gateway changes in the process in which the mobile terminal transmits the packet, only the information of the new header changes, and the information of the existing header does not change.

The local gateway may change the source in the existing header with reference to address change information including the IP addresses and the ports before and after the modifications. In the address change information, the port after the modification is not a port actually used, and may be an arbitrary port for storing the correspondence between the ports before and after the modification.

Next, the local gateway may transmit the encapsulated packet to the Internet gateway (S320). The local gateway may transmit the packet based on the source and the destination of the new header regardless of the source and the destination included in the existing header of the packet.

Next, the Internet gateway receiving the packet from the local gateway may decapsulate the received packet (S330). The decapsulation denotes that the Internet gateway removes the new header of the packet and modifies information included in the existing header.

The source IP address of the existing header may be modified into the IP address of the Internet gateway, and the source port may be modified into the IP address of an arbitrary port. The destination IP address and the destination port of the existing header may not be modified. The information modified in the existing header is shown in detail in Table 2 below.

service server may transmit the packet to the Internet gateway first (S400). The following information may be included in the header of the transmitted packet.

Source ID address: 100.1.1.100

Destination ID address: 200.1.1.20

Source port: yyy

Destination port: xxx"

Next, the Internet gateway receiving the packet from the Internet service server may encapsulate the received packet (S410). Encapsulation denotes that the Internet gateway adds a new header to the header of the packet and modifies information included in the existing header.

In the new header, the following information having the Internet gateway as a source and the local gateway as a destination may be included.

Source ID address: 200.1.1.20

Destination ID address: 2.2.2.10

Source port: 48702

Destination port: 48702

The destination IP address of the existing header may be modified into the tunnel ID of the local gateway, and the destination port may be modified with reference to previously stored address change information. The source IP

TABLE 2

| Before modification | | | | After modification | | | |
|---|---|---|---|---|---|---|---|
| Source IP address | Source port | Destination IP address | Destination port | Source IP address | Source port | Destination IP address | Destination port |
| 1.1.1.10 | xxx' | 100.1.1.100 | yyy | 200.1.1.20 | xxx" | 100.1.1.100 | yyy |

At this time, the Internet gateway may change the source in the existing header with reference to address change information including the IP addresses and the ports before and after the modifications. In the address change information, the port after the modification is not a port actually used, and may be an arbitrary port for storing the correspondence between the ports before and after the modification.

Next, the Internet gateway may transmit the decapsulated packet to the Internet service server (S340).

Figure 4:
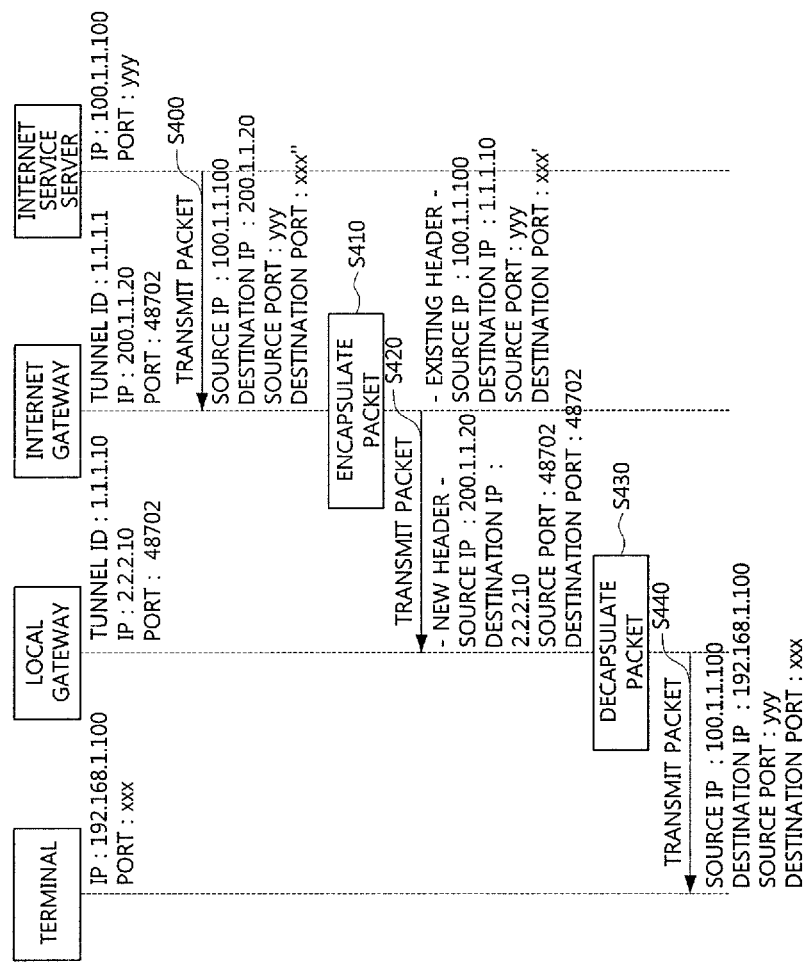
FIG. 4 illustrates a process in which a terminal receives a packet according to an example embodiment of the present invention.

FIG. 4 illustrates a process in which a terminal receives a packet according to an example embodiment of the present invention.

FIG. 4 assumes the same environment as FIG. 3, and a mobile terminal, a local gateway, an Internet gateway, and an Internet service server shown in FIG. 4 are assumed to be the same as those of FIG. 3.

Referring to FIG. 4, when the Internet service server has a packet to transmit to the mobile terminal, the Internet address and the source port of the existing header may not change. The information modified in the existing header is shown in detail in Table 3 below.

TABLE 3

| Before modification | | | | After modification | | | |
|---|---|---|---|---|---|---|---|
| Source IP address | Source port | Destination IP address | Destination port | Source IP address | Source port | Destination IP address | Destination port |
| 100.1.1.100 | yyy | 200.1.1.20 | xxx" | 100.1.1.100 | yyy | 1.1.1.10 | xxx' |

Here, the new header includes the IP address of the local gateway, but the existing header does not include the IP address of the local gateway. Therefore, even when the IP address of the local gateway changes in the process in which the mobile terminal transmits the packet, only the information of the new header changes, and the information of the existing header does not change.

Next, the Internet gateway may transmit the encapsulated packet to the local gateway (S420). The Internet gateway may transmit the packet based on the source and the destination of the new header regardless of the source and the destination included in the existing header of the packet.

Next, the local gateway receiving the packet from the Internet gateway may decapsulate the received packet (S430). The decapsulation denotes that the local gateway removes the new header of the packet and modifies information included in the existing header.

The destination IP address of the existing header may be modified into the IP address of the mobile terminal, and the destination port may be modified with reference to the previously stored address change information. The source IP address and the source port of the existing header may not be modified. The information modified in the existing header is shown in detail in Table 4 below.

TABLE 4

| Before modification | | | | After modification | | | |
|---|---|---|---|---|---|---|---|
| Source IP address | Source port | Destination IP address | Destination port | Source IP address | Source port | Destination IP address | Destination port |
| 100.1.1.100 | yyy | 1.1.1.10 | xxx' | 100.1.1.100 | yyy | 192.168.1.100 | xxx |

Next, the local gateway may transmit the decapsulated packet to the mobile terminal (S440).

Figure 5:
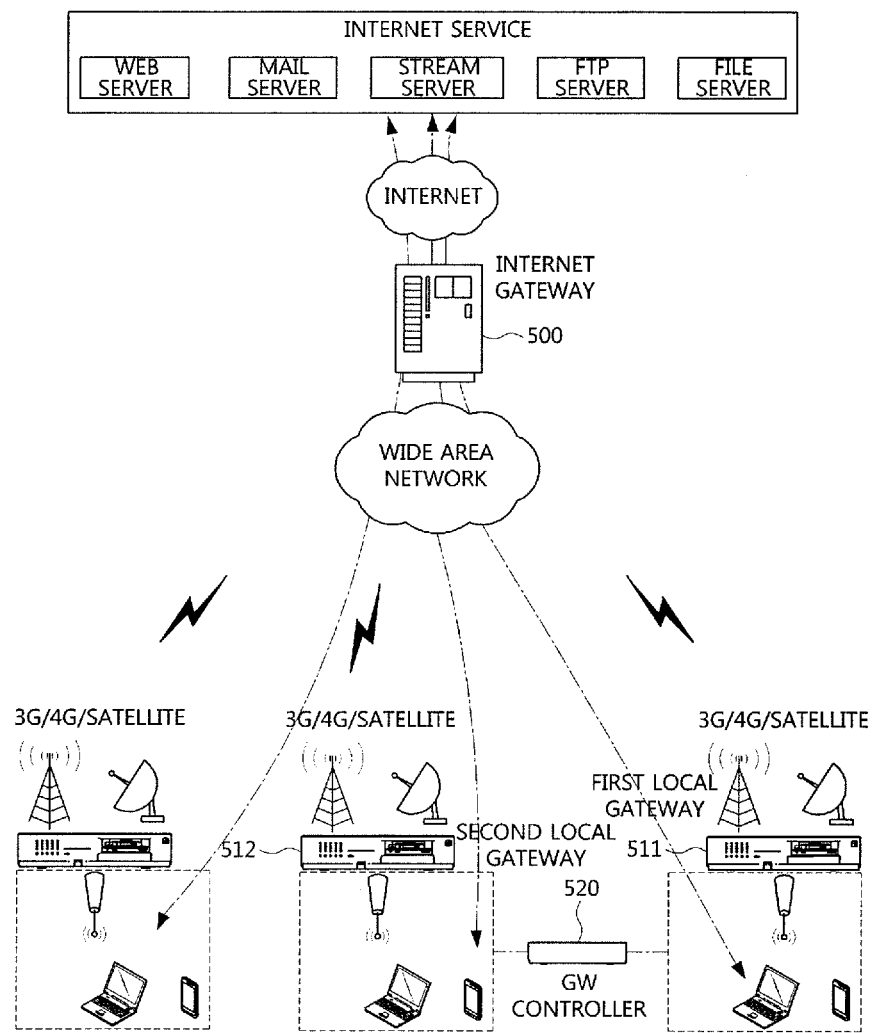
FIG. 5 shows the concept of ensuring network continuity according to an example embodiment of the present invention.

FIG. 5 shows the concept of ensuring network continuity according to an example embodiment of the present invention.

FIG. 5 assumes that an Internet gateway 500 is connected to an Internet service server, a plurality of local gateways 510 are connected to the Internet gateway 500, and a gateway controller 520 controls connection between the local gateways 510. For convenience of description, two local gateways among the plurality of local gateways 510 are referred to as a first local gateway 511 and a second local gateway 512.

Referring to FIG. 5, the first local gateway 511 may communicate with the Internet gateway 500 through an upstream mobile communication signal. In general, the first local gateway 511 moves, and the type of a receivable communication signal may vary according to the location of the first local gateway 511. In some cases, the first local gateway 511 may be in a signal shadow area in which it is not possible to receive any scheme-based signal. In this case, the first local gateway 511 may be connected to the second local gateway 512 outside the signal shadow area through the gateway controller 520, and may communicate with the Internet gateway 500 via the second local gateway 512.

A tunnel may be created between the first local gateway 511 and the second local gateway 512 by tunneling. Also, a tunnel may be created between the second local gateway 512 and the Internet gateway 500 by tunneling. Therefore, although the Internet gateway 500, the first local gateway 511, and the second local gateway 512 are between the Internet service server and a terminal, it is possible for the Internet service server and the terminal to exchange packets as if they were directly connected. Also, even when the first local gateway 511 is in a signal shadow area, the terminal may be provided with a stable Internet service.

Figure 6:
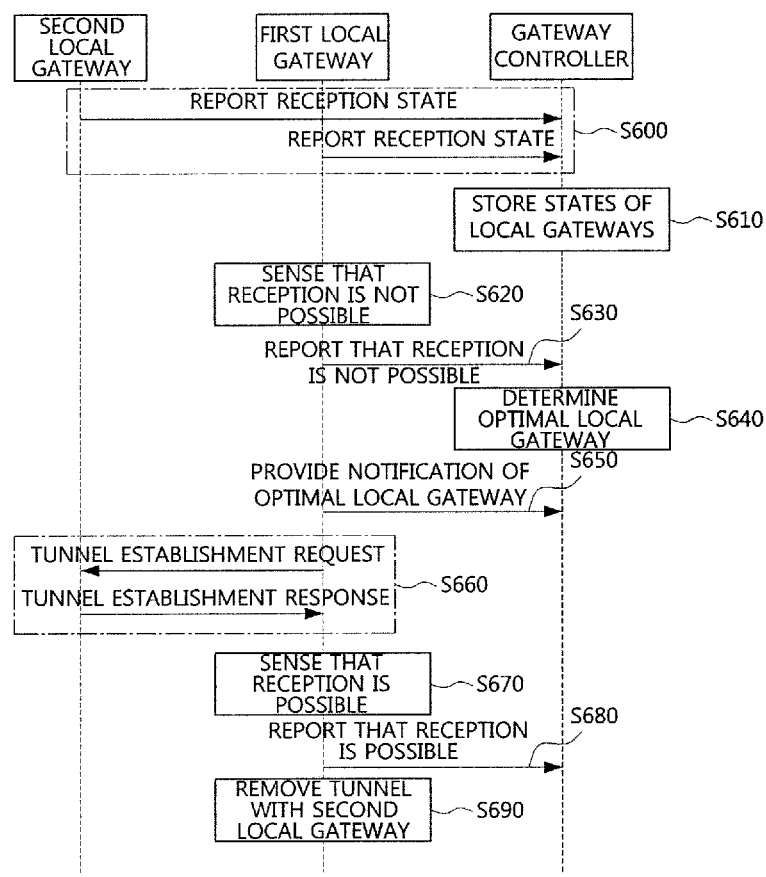
FIG. 6 illustrates a process of connecting local gateways through a gateway controller according to an example embodiment of the present invention.

FIG. 6 illustrates a process of connecting local gateways through a gateway controller according to an example embodiment of the present invention.

FIG. 6 assumes the same environment as FIG. 5.

Referring to FIG. 6, a first local gateway and a second local gateway connected to a gateway controller may report their reception states of communication with an Internet gateway to the gate controller (S600). Reporting of a reception state may be repeated at previously set time intervals. The gateway controller may receive reception state reports not only from the first and second local gateways but also from all local gateways connected thereto.

Next, the gateway controller may store all the received reception states of local gateways (S610).

When the first local gateway cannot receive any uplink signal due to its malfunction, its location in a reception shadow area, etc., the first local gateway may sense that it cannot receive any signal (S620), and may report its reception-impossible state to the gateway controller (S630). At this time, while reporting its reception-impossible state, the first local gateway may request information on another local gateway that will relay to the Internet gateway together with itself.

The gateway controller receiving the reception-impossible state report from the first local gateway may determine an optimal local gateway, which is connected to the first local gateway wirelessly or by wire to transmit and receive a packet and has a signal reception state equal to or better than a previously set reference, with reference to the reception states of other local gateways stored in operation S610 (S640). Also, the gateway controller may report the optimal local gateway to the first local gateway (S650). The optimal local gateway may be determined according to the uplink signal reception rates of respective local gateways, bandwidth-relative traffic capacities, and so on. Here, the optimal local gateway for the first local gateway is assumed to be the second gateway.

The reception-impossible state reported in operation S630 may be included in the reception state information received by the gateway controller in operation S610. Therefore, the gateway controller may check the received or stored reception state information to recognize the reception-impossible state of the first local gateway, and may provide a notification of the optimal gateway even without a request by the first gateway.

The first local gateway notified by the gateway controller that the optimal local gateway is the second local gateway may establish a tunnel with the second local gateway (S660). The first local gateway transmits a tunnel establishment request message, and the second local gateway receiving the message transmits a response message in response to the request, so that the tunnel may be established. Here, the response message may include the tunnel IDs of the first local gateway and the second local gateway.

Subsequently, the first local gateway may exchange packets with the second local gateway through the created tunnel.

At this time, when the first local gateway can receive an uplink communication signal because the first local gateway is repaired or leaves the reception shadow area, the first local gateway may sense that it can receive a signal (S670), and may report the fact to the gateway controller (S680). Subsequently, the first local gateway removes the tunnel established with the second local gateway (S690), and then may directly exchange packets with the Internet gateway rather than via the second local gateway.

FIG. 7 illustrates a process in which a local gateway transmits a packet via another gateway according to an example embodiment of the present invention.

FIG. 7 assumes the same environment as FIG. 6. A mobile terminal, an Internet gateway, and an Internet service server shown in FIG. 7 are the same as those of FIG. 3, and a first local gateway and a second local gateway shown in FIG. 7 are assumed for convenience of description as follows.

—First Local Gateway—
Tunnel ID: 1.1.1.10
IP address: 2.2.2.10
Port: 48702
—Second Local Gateway—
Tunnel ID: 1.1.1.100
IP address: 2.2.2.100
Port: 48702

Referring to FIG. 7, when the mobile terminal has a packet to transmit to the Internet service server, the mobile terminal may transmit the packet to the first local gateway first (S700). The following information may be included in the header of the transmitted packet.

Source ID address: 192.168.1.100
Destination ID address: 100.1.1.100
Source port: xxx
Destination port: yyy Next, the first local gateway receiving the packet from the mobile terminal may encapsulate the received packet (S710). Encapsulation denotes that the first local gateway adds a first header to the header of the packet and modifies information included in the existing header.

In the first header, the following information having the first local gateway as a source and the second gateway as a destination may be included.

Source ID address: 2.2.2.10
Destination ID address: 2.2.2.100
Source port: 48702
Destination port: 48702

The source IP address of the existing header may be modified into the tunnel ID of the first local gateway, and the source port may be modified into an arbitrary port. The destination IP address and the destination port of the existing header may not change. The information modified in the existing header is shown in detail in Table 5 below.

The first local gateway may change the source in the existing header with reference to address change information including the IP addresses and the ports before and after the modifications. In the address change information, the port after the modification is not a port actually used, and may be an arbitrary port for storing the correspondence between the ports before and after the modification.

Next, the first local gateway may transmit the encapsulated packet to the second local gateway (S720). The first local gateway may transmit the packet based on the source and the destination of the first header regardless of the source and the destination included in the existing header of the packet.

Next, the second local gateway receiving the packet from the first local gateway may decapsulate the received packet (S730). The decapsulation denotes that the second local gateway removes the first header of the packet.

Next, the second local gateway may encapsulate the decapsulated packet again (S740). Encapsulation denotes that the second local gateway adds a second header to the header of the packet and modifies information included in the existing header.

In the second header, the following information having the second local gateway as a source and the Internet gateway as a destination may be included.

Source ID address: 2.2.2.100

Destination ID address: 200.1.1.20

Source port: 48702

Destination port: 48702

The source IP address of the existing header may be modified into the tunnel ID of the second local gateway, and the source port may be modified into an arbitrary port. The destination IP address and the destination port of the existing header may not change. The information modified in the existing header is shown in detail in Table 6 below.

TABLE 5

| Before modification | | | | After modification | | | |
| --- | --- | --- | --- | --- | --- | --- | --- |
| Source IP address | Source port | Destination IP address | Destination port | Source IP address | Source port | Destination IP address | Destination port |
| 192.168.1.100 | xxx | 100.1.1.100 | yyy | 1.1.1.10 | xxx' | 100.1.1.100 | yyy |

Here, the first header includes the IP address of the first local gateway, but the existing header does not include the

TABLE 6

| Before modification | | | | After modification | | | |
| --- | --- | --- | --- | --- | --- | --- | --- |
| Source IP address | Source port | Destination IP address | Destination port | Source IP address | Source port | Destination IP address | Destination port |
| 1.1.1.10 | xxx' | 100.1.1.100 | yyy | 1.1.1.10 | xxx" | 100.1.1.100 | yyy |

IP address of the first local gateway. Therefore, even when the IP address of the first local gateway changes in the process in which the mobile terminal transmits the packet, only the information of the first header changes, and the information of the existing header does not change.

Here, the second header includes the IP address of the second local gateway, but the existing header does not include the IP address of the second local gateway. Therefore, even when the IP address of the second local gateway changes in the process in which the mobile terminal transmits the packet, only the information of the second header changes, and the information of the existing header does not change.

The second local gateway may change the source in the existing header with reference to address change information including the IP addresses and the ports before and after the modifications. In the address change information, the port after the modification is not a port actually used, and may be an arbitrary port for storing the correspondence between the ports before and after the modification.

The decapsulation of operation S730 and the encapsulation of operation S740 may be performed without substantial separation. In other words, instead of performing the decapsulation and the encapsulation in sequence, the second local gateway may convert the first header of the packet into the second header and modify the existing header as shown in Table 6 (S745).

Next, the second local gateway may transmit the encapsulated packet to the Internet gateway (S750). The second local gateway may transmit the packet based on the source and the destination of the second header regardless of the source and the destination included in the existing header of the packet.

Next, the Internet gateway receiving the packet from the second local gateway may decapsulate the received packet (S760). The decapsulation denotes that the Internet gateway removes the second header of the packet and modifies information included in the existing header.

The source IP address of the existing header may be modified into the IP address of the Internet gateway, and the source port may be modified into the IP address of an arbitrary port. The destination IP address and the destination port of the existing header may not be modified. The information modified in the existing header is shown in detail in Table 7 below.

FIG. 8 assumes the same environment as FIG. 7, and a mobile terminal, an Internet gateway, and an Internet service server shown in FIG. 8 are assumed to be the same as those of FIG. 7.

Referring to FIG. 8, when the Internet service server has a packet to transmit to the mobile terminal, the Internet service server may transmit the packet to the Internet gateway (S800). The following information may be included in the header of the transmitted packet.

Source ID address: 100.1.1.100

Destination ID address: 200.1.1.20

Source port: yyy

Destination port: xxx'''

Next, the Internet gateway receiving the packet from the Internet service server may encapsulate the received packet (S810). Encapsulation denotes that the Internet gateway adds a second header to the header of the packet and modifies information included in the existing header.

In the second header, the following information having the Internet gateway as a source and the second gateway as a destination may be included.

Source ID address: 200.1.1.20

Destination ID address: 2.2.2.100

Source port: 48702

Destination port: 48702

The destination IP address of the existing header may be modified into the tunnel ID of the second local gateway, and the destination port may be modified with reference to previously stored address change information. The source IP

TABLE 7

| Before modification | | | | After modification | | | |
|---|---|---|---|---|---|---|---|
| Source IP address | Source port | Destination IP address | Destination port | Source IP address | Source port | Destination IP address | Destination port |
| 1.1.1.100 | xxx'' | 100.1.1.100 | yyy | 200.1.1.20 | xxx''' | 100.1.1.100 | yyy |

At this time, the Internet gateway may change the source in the existing header with reference to address change information including the IP addresses and the ports before address and the source port of the existing header may not change. The information modified in the existing header is shown in detail in Table 8 below.

TABLE 8

| Before modification | | | | After modification | | | |
|---|---|---|---|---|---|---|---|
| Source IP address | Source port | Destination IP address | Destination port | Source IP address | Source port | Destination IP address | Destination port |
| 100.1.1.100 | yyy | 200.1.1.20 | xxx''' | 100.1.1.100 | yyy | 1.1.1.100 | xxx'' | and after the modifications. In the address change information, the port after the modification is not a port actually used, and may be an arbitrary port for storing the correspondence between the ports before and after the modification.

Next, the Internet gateway may transmit the decapsulated packet to the Internet service server (S770).

FIG. 8 illustrates a process in which a local gateway receives a packet via another local gateway according to an example embodiment of the present invention.

Here, the second header includes the IP address of the second local gateway, but the existing header does not include the IP address of the second local gateway. Therefore, even when the IP address of the second local gateway changes in the process in which the mobile terminal receives the packet, only the information of the second header changes, and the information of the existing header does not change.

Next, the Internet gateway may transmit the encapsulated packet to the second local gateway (S820). The Internet gateway may transmit the packet based on the source and the destination of the second header regardless of the source and the destination included in the existing header of the packet.

Next, the second local gateway receiving the packet from the Internet gateway may decapsulate the received packet (S830). The decapsulation denotes that the second local gateway removes the second header of the packet.

Next, the second local gateway may encapsulate the decapsulated packet again (S840). Encapsulation denotes that the second local gateway adds a first header to the header of the packet and modifies information included in the existing header.

In the first header, the following information having the second local gateway as a source and the first local gateway as a destination may be included.
  Source ID address: 2.2.2.100
  Destination ID address: 2.2.2.10
  Source port: 48702
  Destination port: 48702

The destination IP address of the existing header may be modified into the tunnel ID of the first local gateway, and the source port may be modified with reference to the previously stored address change information. The source IP address and the source port of the existing header may not change. The information modified in the existing header is shown in detail in Table 9 below.

TABLE 9

| Before modification | | | | After modification | | | |
|---|---|---|---|---|---|---|---|
| Source IP address | Source port | Destination IP address | Destination port | Source IP address | Source port | Destination IP address | Destination port |
| 100.1.1.100 | yyy | 1.1.1.100 | xxx'' | 100.1.1.100 | yyy | 1.1.1.10 | xxx' |

Here, the first header includes the IP address of the first local gateway, but the existing header does not include the IP address of the first local gateway. Therefore, even when the IP address of the first local gateway changes in the process in which the mobile terminal receives the packet, only the information of the first header changes, and the information of the existing header does not change.

The decapsulation of operation S830 and the encapsulation of operation S840 may be performed without substantial separation. In other words, instead of performing the decapsulation and the encapsulation in sequence, the second local gateway may convert the second header of the packet into the first header and modify the existing header as shown in Table 9 (S845).

Next, the second local gateway may transmit the encapsulated packet to the first local gateway (S850). The second local gateway may transmit the packet based on the source and the destination of the first header regardless of the source and the destination included in the existing header of the packet.

Next, the first local gateway receiving the packet from the second local gateway may decapsulate the received packet (S860). The decapsulation denotes that the first local gateway removes the first header of the packet and modifies information included in the existing header.

The destination IP address of the existing header may be modified into the IP address of the mobile terminal, and the destination port may be modified with reference to the previously stored address change information. The source IP address and the source port of the existing header may not be modified. The information modified in the existing header is shown in detail in Table 10 below.

TABLE 10

| Before modification | | | | After modification | | | |
|---|---|---|---|---|---|---|---|
| Source IP address | Source port | Destination IP address | Destination port | Source IP address | Source port | Destination IP address | Destination port |
| 100.1.1.100 | yyy | 1.1.1.10 | xxx' | 100.1.1.100 | yyy | 192.168.1.100 | xxx |

At this time, the mobile terminal connected to the first local gateway may be plural in number. Therefore, the first local gateway may store information on arbitrary ports corresponding to the respective mobile terminals to distinguish the plurality of mobile terminals from each other.

Next, the first local gateway may transmit the decapsulated packet to the mobile terminal (S870).

According to the above-described apparatus and method for ensuring network continuity, even when the type of an uplink signal received by a gateway changes or the gateway is in an uplink signal shadow area, a terminal connected to the gateway can be provided with a seamless Internet service.

While the example embodiments of the present invention and their advantages have been described in detail, it should be understood that various changes, substitutions and alterations may be made herein without departing from the scope of the invention.

What is claimed is:

1. A method of ensuring network continuity performed at a local gateway, the method comprising:
  establishing a tunnel with a fixed gateway serving as a relay between an Internet service server and the local gateway;
  performing communication with the fixed gateway through the tunnel;
  receiving a packet from a terminal;
  modifying a source Internet protocol (IP) address in a header of the received packet into a tunnel identifier (ID) of the local gateway;
  adding a tunnel header to the modified packet;
  setting an IP address of the local gateway as a source IP address in the tunnel header; and
  setting an IP address of the fixed gateway as a destination IP address in the tunnel header.

2. The method of claim 1, wherein the local gateway communicates with the fixed gateway based on a plurality of communication schemes.

3. The method of claim 1, wherein the local gateway communicates with a terminal served by the local gateway based on a wireless local area network (WLAN) scheme.

4. The method of claim 1, wherein the establishing of the tunnel comprises;

transmitting a message for requesting tunnel establishment to the fixed gateway; and receiving the tunnel ID of the local gateway and the tunnel ID of the fixed gateway in response to the transmission of the message for requesting tunneling establishment.

5. The method of claim 4, wherein the performing of the communication comprises, when a packet is received from the fixed gateway:

removing a tunnel header added by the fixed gateway; and setting a destination IP address of a remaining header as an IP address of a terminal which will receive the packet.

6. A method of ensuring network continuity performed at a fixed gateway serving as a relay between an Internet service server and a local gateway, the method comprising:

establishing a tunnel with the local gateway;

performing communication with the local gateway through the established tunnel;

receiving a packet from an Internet service server providing an Internet service;

modifying a destination Internet protocol (IP) address in a header of the received packet into a tunnel identifier (ID) of the local gateway;

adding a tunnel header to the modified packet;

setting in IP address of the fixed gateway as a source IP address in the tunnel header; and setting an IP address of the local gateway as a destination IP address in the tunnel header.

7. The method of claim 6, wherein the fixed gateway communicates with the local gateway based on a plurality of communication schemes.

8. The method of claim 6, wherein the establishing of the tunnel comprises:

receiving a tunnel establishment request message from the local gateway; and transmitting the tunnel ID of the fixed gateway and the tunnel ID of the local gateway in response to the reception of the tunnel establishment request message.

9. The method of claim 8, wherein the performing of the communication comprises, when a packet is received from the local gateway:

removing a tunnel header added by the local gateway; and setting the source IP address of a remaining header as the IP address of the fixed gateway.

* * * * *